United States Patent
Zhao et al.

(10) Patent No.: US 11,441,726 B2
(45) Date of Patent: Sep. 13, 2022

(54) CONNECTION ASSEMBLY AND ROBOT HAVING THE SAME

(71) Applicant: UBTECH ROBOTICS CORP LTD, Shenzhen (CN)

(72) Inventors: Kunlei Zhao, Shenzhen (CN); Youjun Xiong, Shenzhen (CN); Wenhua Yu, Shenzhen (CN); Jiawen Hu, Shenzhen (CN); Yangyu Pi, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 519 days.

(21) Appl. No.: 16/435,575

(22) Filed: Jun. 10, 2019

(65) Prior Publication Data
US 2020/0200323 A1    Jun. 25, 2020

(30) Foreign Application Priority Data

Dec. 21, 2018   (CN) .......................... 201811590988.6

(51) Int. Cl.
*F16M 11/16*  (2006.01)
*F16M 11/04*  (2006.01)
(Continued)

(52) U.S. Cl.
CPC .............. *F16M 11/16* (2013.01); *F16M 11/04* (2013.01); *F16M 11/22* (2013.01);
(Continued)

(58) Field of Classification Search
CPC ........ F16M 11/16; F16M 11/04; F16M 11/22; F16M 2200/02; F16M 2200/08;
(Continued)

(56) References Cited

U.S. PATENT DOCUMENTS 4,840,338 A * 6/1989 O'Connor ............... F16B 7/105
                                                     248/168
5,065,973 A * 11/1991 Wang .................. F16M 13/022
                                                     248/362
(Continued)

FOREIGN PATENT DOCUMENTS

| CN | 203696836 U | 7/2014 |
| CN | 206780204 U | 12/2017 |
| CN | 109015607 A | 12/2018 |

OTHER PUBLICATIONS

Machine Translation of CN206780204, Yan Xinzhang.*
Machine Translation of CN203696836, Zhang Wei.*

*Primary Examiner* — Christopher Garft

(57) ABSTRACT

A connection assembly for holding a support member in position includes: a base defining a receiving hole to receive an end portion of the support member, and a guiding hole in a lateral surface thereof, which communicates with the receiving hole; a fixing block; a locking member slidably received in the guiding hole and slidable between a first position where the locking member is engaged with the support member so as to hold the support member in position, and a second position where the locking member is disengaged from the support member; and an actuating member connected to the fixing block and the locking member, the actuating member being configured to drive the locking member to move between the first position and the second position.

19 Claims, 7 Drawing Sheets

(51) Int. Cl.
*F16M 11/22* (2006.01)
*G06N 3/00* (2006.01)

(52) U.S. Cl.
CPC ..... *F16M 2200/02* (2013.01); *F16M 2200/08* (2013.01); *G06N 3/00* (2013.01)

(58) Field of Classification Search
CPC .. F16M 11/041; F16M 2200/024; G06N 3/00; E04H 12/2238; E04H 12/2284; E04H 12/2253; E04H 12/2261; E04H 12/2269; E04H 12/2276
USPC ................. 901/46; 248/188.8, 519, 523–527
See application file for complete search history.

(56) References Cited

U.S. PATENT DOCUMENTS

| | | | | |
|---|---|---|---|---|
| 5,197,819 | A * | 3/1993 | Hughes | E01F 9/681 116/63 R |
| 5,845,377 | A * | 12/1998 | Bibeault | F16M 13/02 24/634 |
| 5,893,541 | A * | 4/1999 | Michaelson | F16M 11/041 248/158 |
| 7,431,259 | B2 * | 10/2008 | Tung | A45B 17/00 135/20.3 |
| 2002/0130242 | A1 * | 9/2002 | Thurner | A47G 33/1213 248/523 |
| 2006/0219849 | A1 * | 10/2006 | Chiu | F16M 11/24 248/125.8 |
| 2013/0256351 | A1 * | 10/2013 | Kodama | B60N 3/106 224/400 |
| 2017/0259430 | A1 * | 9/2017 | Yoon | B25J 18/02 |
| 2019/0335924 | A1 * | 11/2019 | Speagle | F16M 11/08 |

* cited by examiner

CONNECTION ASSEMBLY AND ROBOT HAVING THE SAME

CROSS REFERENCE TO RELATED APPLICATIONS

This application claims priority to Chinese Patent Application No. 201811590988.6, filed Dec. 21, 2018, which is hereby incorporated by reference herein as if set forth in its entirety.

BACKGROUND

1. Technical Field

The present disclosure generally relates to robots, and particularly to a robot having a connection assembly for holding a support member in position.

2. Description of Related Art

Many devices such as robots include a support member that is fixed to another component by conventional fasteners, such as screws. Although the conventional fasteners meet basic needs, a new connection assembly for holding the support member in position is desirable and useful.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
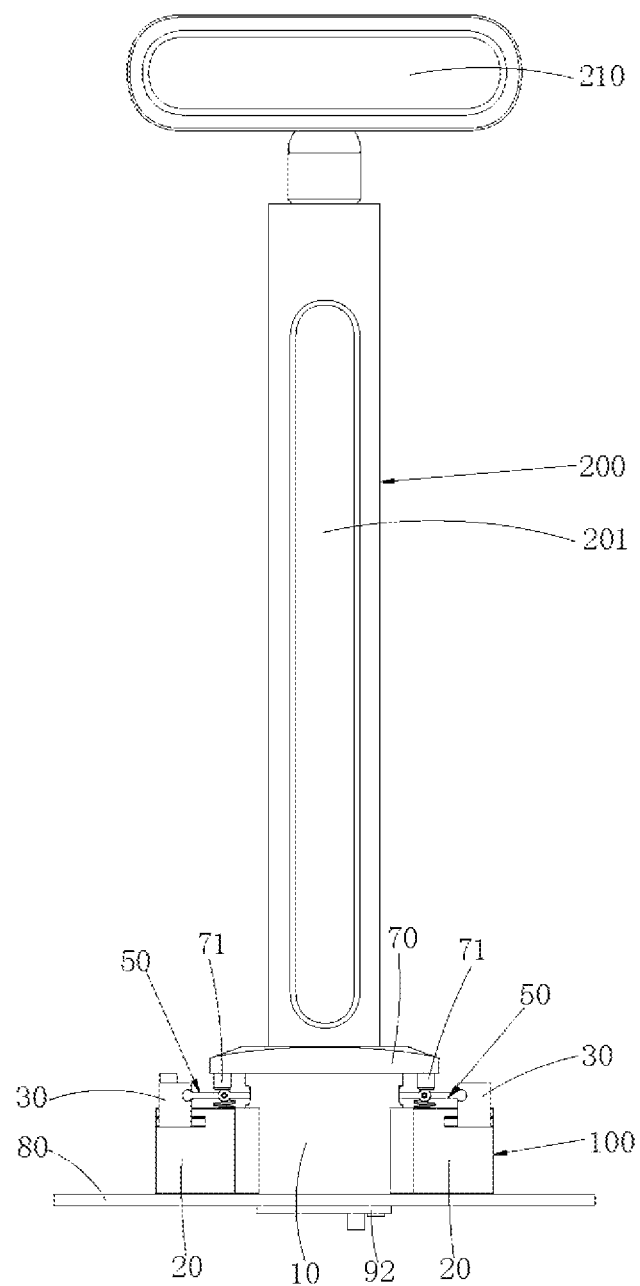
FIG. 1 is a schematic planar view of a support member and a connection assembly of a robot.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Referring to FIGS. 1-4, in one embodiment, a connection assembly 100 for holding a support member 200 in position includes a base 10, a fixing block 20, a locking member 40 and an actuating member 50. The base 10 defines a receiving hole 11 to receive an end portion of the support member 200, and a guiding hole 12 in a lateral surface thereof, which communicates with the receiving hole 11. The locking member 40 is slidably received in the guiding hole 12, and slidable between a first position where the locking member 40 is engaged with the support member 200 so as to hold the support member 200 in position, and a second position where the locking member 40 is disengaged from the support member 200. The actuating member 50 is connected to the fixing block 20 and the locking member 40, and used to drive the locking member 40 to move between the first position and the second position.

When the support member 200 is assembled, the lower end portion 200a of the support member 200 is pushed into the receiving hole 11 of the base 10, and the locking member 40 is then slidably mounted in the guiding hole 12 of the base 10. The locking mechanism 50 pushes the locking member 40 to abut against the support member 200, thereby holding the support member 200 in position. When the support member 200 needs to be detached, the locking member 40 is disengaged from the support member 200 by the actuating member 50, which frees the support member 200 from the restriction of the locking member 40. The connection assembly 100 is simple in structure, cost-effective and can hold the support member 200 in position without using screws.

In one embodiment, the fixing block 20 is connected to the base 10. The fixing, block 20 may be integrally formed with the base 10 or fixed to the base 10 by fasteners. Alternatively, the fixing block 20 may be held at a predetermined distance from the base 10. Specifically, the base 10 is fixed to a bottom plate 80 by screws, and the fixing block 20 is fixed to the bottom plate 80 adjacent to the fixing block 20 by screws.

Figure 2:
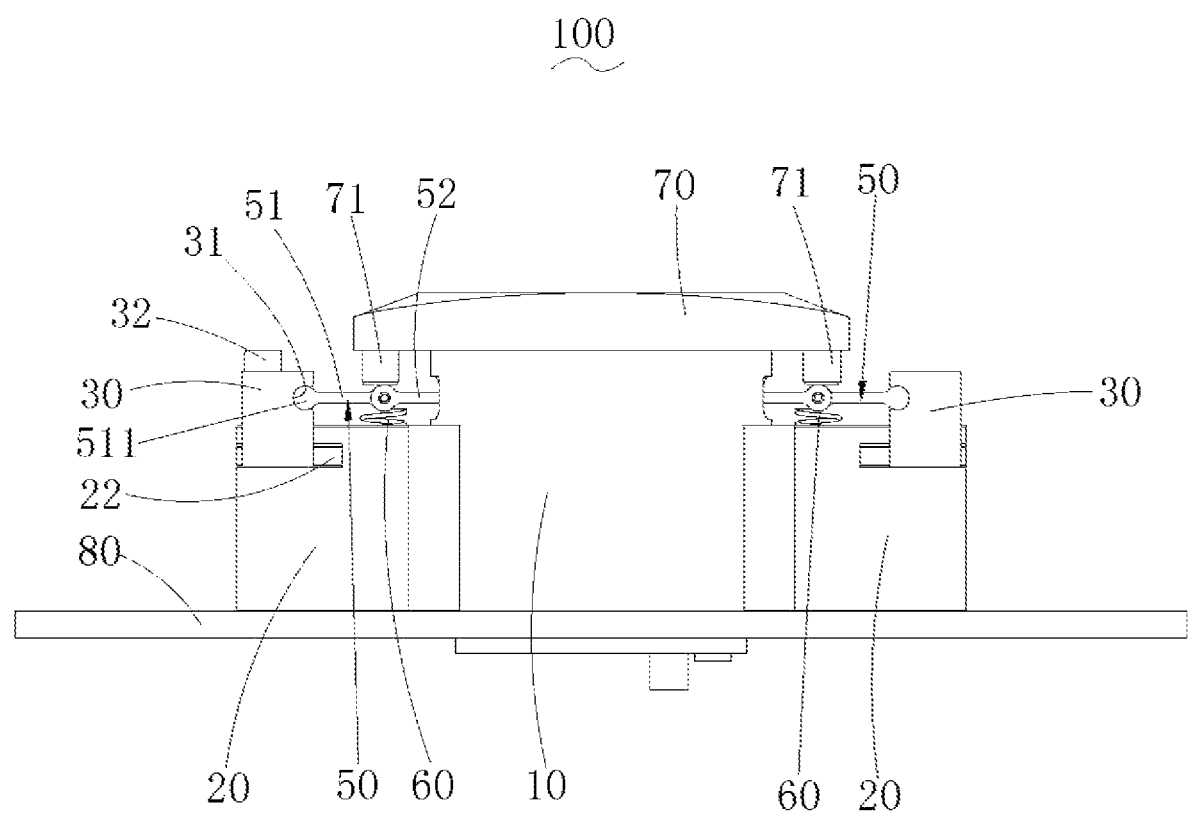
FIG. 2 is a schematic planar view of the connection assembly of FIG. 1, with an actuating member being in an extension state.
Figure 5:
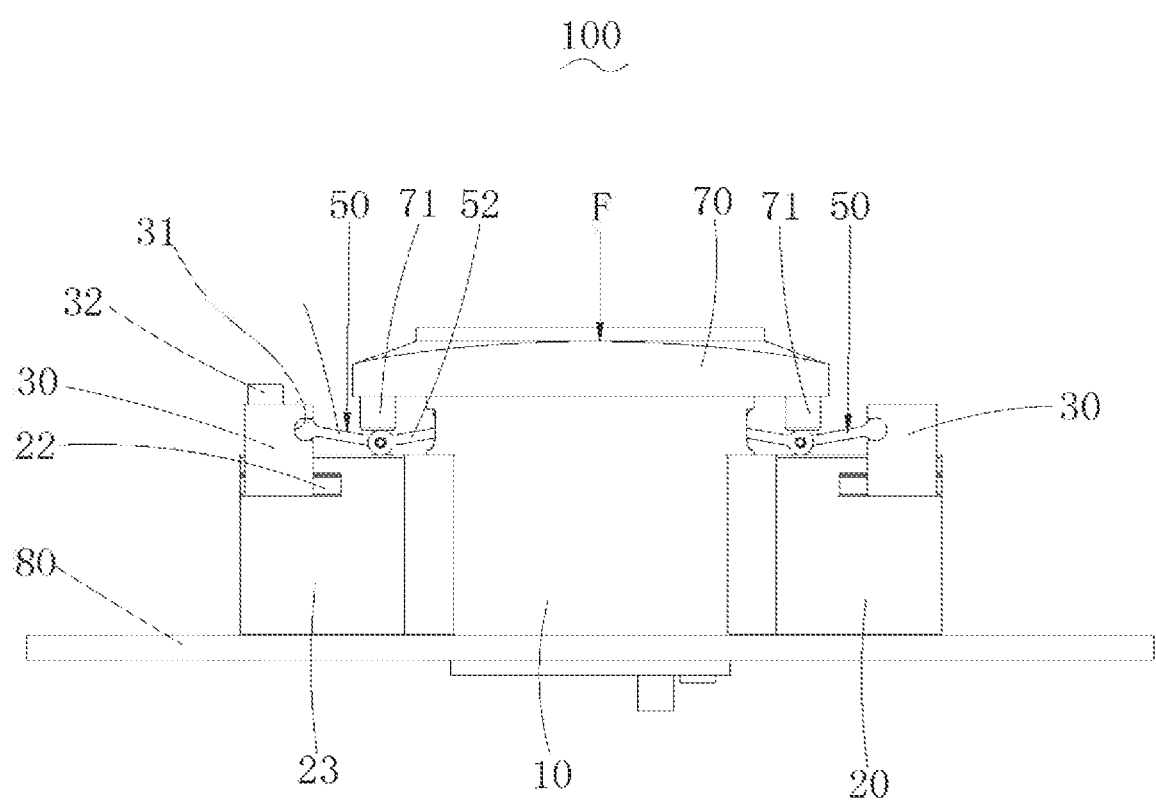
FIG. 5 is similar to FIG. 2, but with the actuating member being in a flexion state.

In one embodiment, the actuating member 50 includes a first linkage bar 51 and a second linkage bar 52 rotatably connected to the first linkage bar 51. One end of the first linkage bar 51 is rotatably connected to the fixing block 20, and one end of the second linkage bar 52 is rotatably connected to the locking member 40. The first linkage bar 51, the second linkage bar 52, the locking member 40, and the fixing member 20 and the base 10 as a whole constitute a four-bar linkage mechanism. As shown in FIG. 2, when the actuating member 50 is in an extension state, that is, the first linkage bar 51 and the second linkage bar 52 extend along a same straight line, the locking member 40 is pushed by the second linkage bar 52 to the first position, which locks the support member 200 to the base 10. As shown in FIG. 5, when the actuating member 50 is in a flexion state, that is, the first linkage bar 51 and the second linkage bar 52 form an obtuse angle, the locking member 40 is pulled back from the first position to the second position, which frees the support member 200 from the restriction of the locking member 40, thereby allowing the support member 200 to be removed from the connection assembly 100. The first linkage bar 51 and the second linkage bar 52 are connected to each other via a pivot shaft 53.

Figure 6:
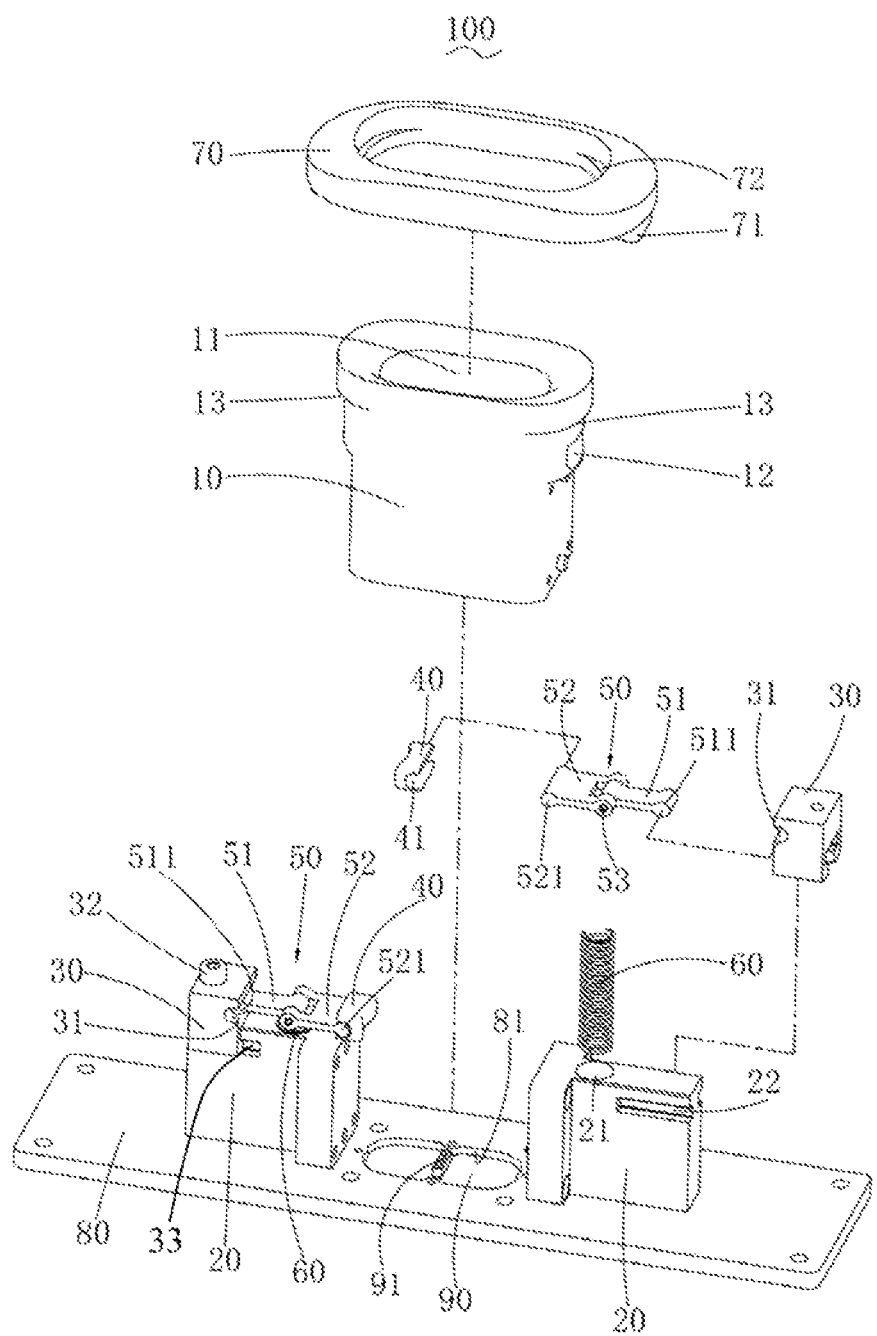
FIG. 6 is an isometric exploded view of the connection assembly of FIG. 1.
Figure 7:
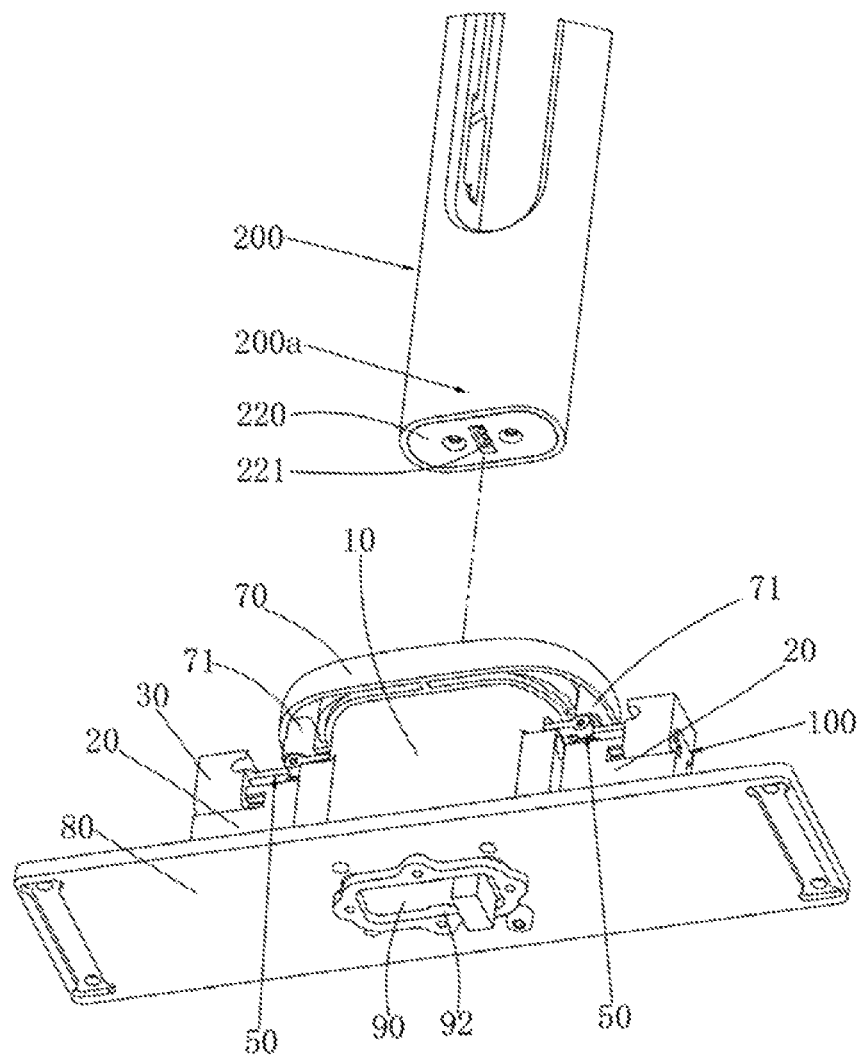
FIG. 7 is similar to FIG. 4, but viewed from a different perspective.

Referring to FIGS. 6-7, in one embodiment, the fixing block 20 includes a main body 23 and an adjustable block 30 fixed to the main body 23. The actuating member 50 is connected to the adjustable block 30. The adjustable block 30 defines a mounting socket 31, and the first linkage bar 51 includes at an end a pivot portion 511 that is rotatably received in the mounting socket 31, which rotatably connects the first linkage bar 51 to the adjustable block 30. The locking member 40 defines a mounting socket 41, and the second linkage bar 52 includes at an end a pivot portion 521 that is rotatably received in the mounting socket 41, which rotatably connects the second linkage bar 52 to the locking member 40.

In one embodiment, the connection assembly further includes an elastic member 60 to drive the first linkage bar 51 and the second linkage bar 52 to rotate with respect to each other, which changes the actuating member 50 from a flexion state to an extension state so as to push the locking member 40 to the first position.

In one embodiment, the fixing block 20 defines an accommodating hole 21 to receive the elastic member 60. The elastic member 60 is a coil spring having a top end abutting against an end of the second linkage bar 52 where the first linkage bar 51 is connected, and a bottom end abutting against the bottom of the accommodating hole 21. The elastic member 60 is thus compressed between the second linkage bar 52 and the bottom of the accommodating hole 21. As shown in FIG. 2, when the actuating member 50 is in the extension state, the top end of the elastic member 60 protrudes out of the accommodating hole 21.

Figure 3:
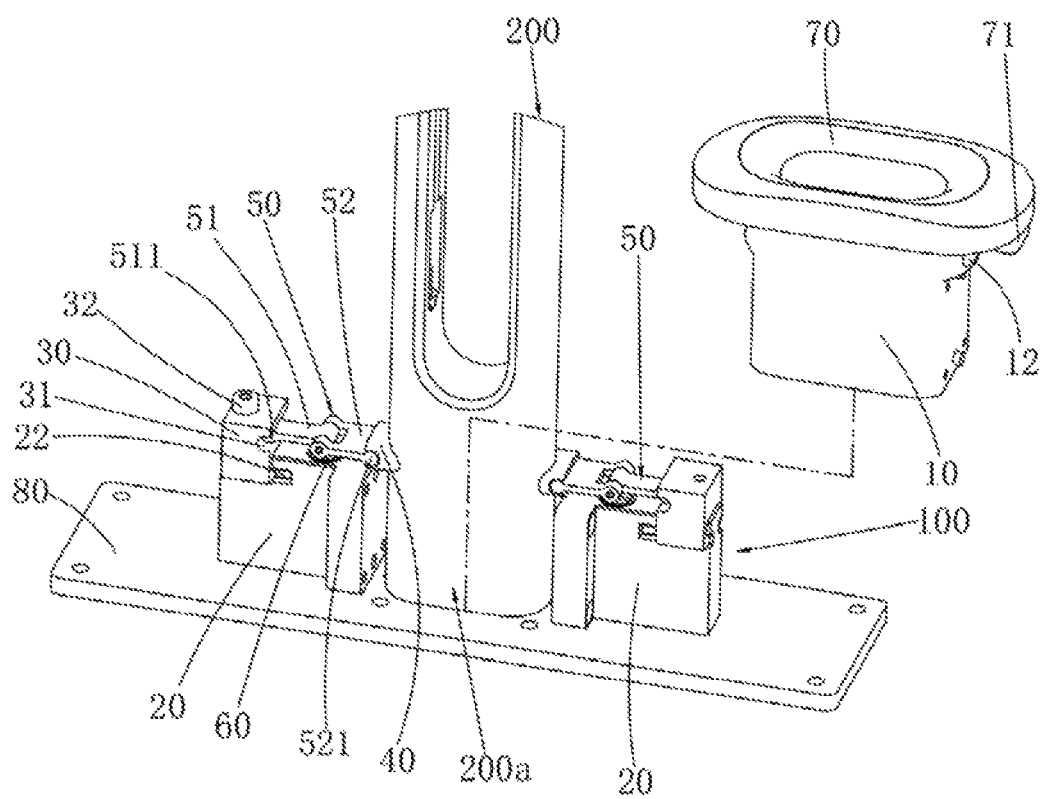
FIG. 3 is a schematic isometric view of the support member and the connection assembly of FIG. 1, with a base of the connection assembly detached from the support member.
Figure 4:
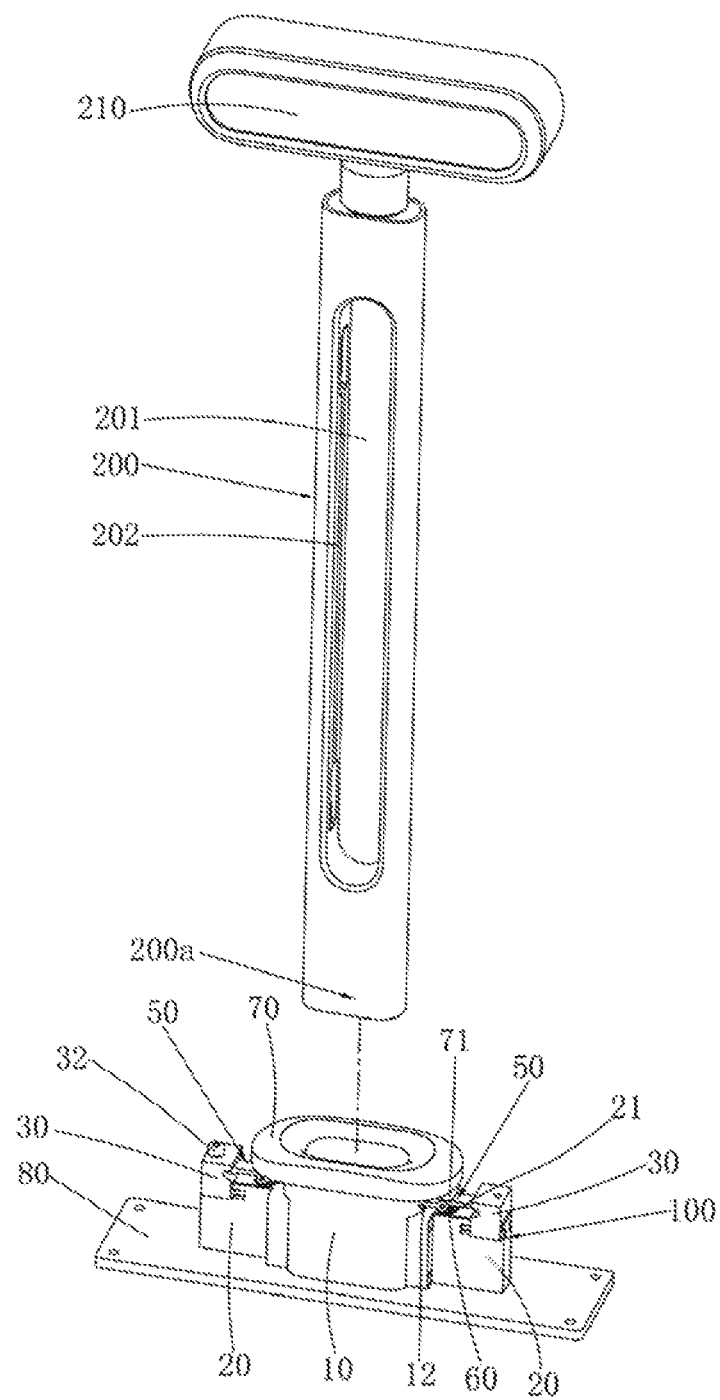
FIG. 4 is similar to FIG. 3, but with the support member detached from the connection assembly.

In one embodiment, the connection assembly further includes a pushing ring 70 that is arranged around the lateral surface of the base 10 and slidable with respect to the base 10. The pushing ring 7 includes a projection 71 to drive the first linkage bar and the second linkage bar to rotate with respect to each other, which changes the actuating member 50 from the extension state to the flexion state so as to pull the locking member 40 to the second position. In the embodiment, the projection 71 abuts against an end of the second linkage bar 52 where the first linkage bar 51 is connected. Referring to FIG. 5, when the support member 200 needs to be removed, the pushing ring 70 can be pressed so as to allow the projection 71 to drive the actuating member 50 from the extension state to the flexion state. The locking member 40 is thus pulled to be disengaged from the support member 200, thereby allowing the support, member 200 to be removed. Referring to FIGS. 1 to 3, during insertion of the lower end portion of the support member 200 into the receiving hole 11, the pushing ring 70 is pressed. After the lower end portion of the support member 200 is insured into the receiving hole 11, the pushing ring 70 is released, and under the elastic force of the elastic member 60, the first link 51 and the second link 52 are driven to change from the flexion state to the extension state. The locking member 40 is then pushed into the receiving hole 11 of the base 10 to fix the support member 200. During the rotation of the first link 51 and the second link 52, the pushing ring 70 is moved upward to its original position. There is a self-locking phenomenon when the actuating member 50 is in the extension state, the support member 200 can be firmly held in position.

In one embodiment, the pushing ring 70 includes an inner protrusion 72 on an inner lateral surface thereof. The base 10 includes an outer protrusion 13 on an outer lateral surface thereof. The outer protrusion 13 rests on the inner protrusion 72, which prevents the pushing ring 70 from disengaging from the base. With such configuration, the pushing ring 70 is slidably held between the outer protrusion 13 and the second linkage bar 52.

In one embodiment, the adjustable block 30 is fixed to the main body 23 of the fixing block 20, but the position of the adjustable block 30 can be adjusted according to need. Specifically, the main body 23 defines a guiding groove 22, and the adjustable block 30 includes a slider portion 33 slidably received in the guiding groove 22, which facilitates the adjustment of the position of the adjustable block 30 with respect to the main body 23. After the adjustable block 30 is move to a desired position, it is fixed to the main body 23 via a screw 32. The screw 32 is threadedly connected to the adjustable block 30 and an end of the screw 32 abuts against the main body 23. Since the adjustable block 30 can be fixed to the main body 23 at various positions, the locking member 40 can be pushed to various positions to abut against different support members 200 with different width.

In one embodiment, a rubber pad is fixed to the end of the locking member 40 so as to provide sufficient friction to firmly hold the support member 200 in position.

In one embodiment, the base 10 defines two guiding holes 12 that are evenly arranged in a lateral surface thereof. The numbers of the guiding holes 12, the fixing blocks 20, the adjustable blocks 30, the locking members 40, and the actuating members 50 are the same. The fixing blocks 20 are arranged at opposite sides of the base 10. The two actuating members 50 respectively drive the locking members 40 such that the locking members 40 abut against the support member 200, thereby holding the support member 200 in position. With such configuration, the support member 200 is held in position by two locking members 40 from opposite directions. In the embodiment, the two locking members 40 can be controlled by the pushing ring 70 to disengage from the support member 200, which allows the support member 200 to be removed from the connection assembly.

Referring to FIGS. 1, 6 and 7, in one embodiment, a robot includes the support member 200 and the connection assembly 100 for holding the support member 200 in position. When the support member 200 is assembled, the lower end portion 200a of the support member 200 is pushed into the receiving hole 11 of the base 10, and the locking member 40 is then slidably mounted in the guiding hole 12 of the base 10. The locking mechanism 50 pushes the locking member 40 to abut against the support member 200, thereby holding the support member 200 in position. When the support member 200 needs to be detached, the locking member 40 is disengaged from the support member 200 by the actuating member 50, which frees the support member 200 from the restriction of the locking member 40. The connection assembly 100 is simple in structure, cost-effective and can hold the support member 200 in position without using screws.

In one embodiment, the robot further includes a sensor 210 fixed to a first end of the support member 200, a first circuit board 220 fixed to a second end of the support member 200 and electrically connected to the sensor 210, and a second circuit board 90. The first circuit board 220 has a number of contacts 221. The second circuit board 90 is fixed to the bottom plate 80 and faces the first circuit board 220. The second circuit board 90 includes a number of spring-loaded pins 91 that come into contact with the contacts 221 when the support member 200 is held in position. The sensor 210 is thus electrically connected to a main circuit board of the robot.

In one embodiment, the sensor 210 is an RGBD sensor. The support member 200 defines a hollow space 201 extending along a lengthwise direction thereof. The sensor 210 is connected to the first circuit board 220 by a signal line. A groove 202 is defined in a side of the hollow space 201, and signal lines are disposed in the groove 202. The bottom plate 80 defines a through hole 81, and the second circuit board 90 is arranged in the through hole 81. The second circuit board 90 is fixed to the bottom plate 80 by a fixing member 92.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A connection assembly for holding a support member in position, the connection assembly comprising:
   a base defining a receiving hole to receive an end portion of the support member, and a guiding hole in a lateral surface thereof, which communicates with the receiving hole;
   a fixing block;
   a locking member slidably received in the guiding hole, the locking member being slidable between a first position where the locking member is engaged with the support member so as to hold the support member in position, and a second position where the locking member is disengaged from the support member;
   an actuating member connected to the fixing block and the locking member, the actuating member being configured to drive the locking member to move between the first position and the second position, wherein the actuating member comprises a first linkage bar and a second linkage bar rotatably connected to the first linkage bar, one end of the first linkage bar is rotatably connected to the fixing block, and one end of the second linkage bar is rotatably connected to the locking member;
   an elastic member configured to drive one of the first linkage bar and the second linkage bar to rotate with respect to the other one of the first linkage bar and the second linkage bar, which changes the actuating member from a flexion state to an extension state so as to push the locking member to the first position; and
   a pushing ring slidably connected to the base, wherein the pushing ring comprises a projection configured to drive the one of the first linkage bar and the second linkage bar to rotate with respect to the other one of the first linkage bar and the second linkage bar, which changes the actuating member from the extension state to the flexion state so as to pull the locking member to the second position.

2. The connection assembly according to claim 1, wherein the block defines an accommodating hole to receive the elastic member, and one end of the elastic member abuts against the one of the first linkage bar and the second linkage bar and protrudes out of the accommodating hole.

3. The connection assembly according to claim 1, wherein the pushing ring comprises an inner protrusion, the base comprises an outer protrusion, and the outer protrusion rests on the inner protrusion, which prevents the pushing ring from disengaging from the base.

4. The connection assembly according to claim 1, wherein the fixing block comprises a main body and an adjustable block fixed to the main body, and the actuating member is connected to the adjustable block.

5. The connection assembly according to claim 4, wherein the main body defines a guiding groove, and the adjustable block comprises a slider portion slidably received in the guiding groove.

6. A robot comprising a support member and a connection assembly for holding a support member in position, the connection assembly comprising:
   a base defining a receiving hole to an end portion of the support member, and a guiding hole in a lateral surface thereof, which communicates with the receiving hole;
   a fixing block;
   a locking member slidably received in the guiding hole, the locking member being slidable between a first position where the locking member is engaged with the support member so as to hold the support member in position, and second position where the locking member is disengaged from the support member; and
   an actuating member connected to the fixing block and the locking member the actuating member being configured to drive the locking member to move between the first position and the second position;
   wherein the robot further comprises a sensor fixed to a first end of the support member, a first circuit board fixed to a second end of the support member and electrically connected to the sensor, and a second circuit board, wherein the first circuit board comprises a plurality of contacts, the connection assembly further comprises a bottom plate where the base and the fixing block are fixed, the second circuit board is fixed to the bottom plate and faces the first circuit board, the second circuit board comprises a plurality of spring-loaded pins, and the spring-loaded pins come into contact with the contacts when the support member is held in position.

7. The robot according to claim 6, wherein the actuating member comprises a first linkage bar and a second linkage bar rotatably connected to the first linkage bar, one end of the first linkage bar is rotatably connected to the fixing block, and one end of the second linkage bar is rotatably connected to the locking member.

8. The robot according to claim 7, further comprising an elastic member configured to drive one of the first linkage bar and the second linkage bar to rotate with respect to the other one of the first linkage bar and the second linkage bar, which changes the actuating member from a flexion state to an extension state so as to push the locking member to the first position.

9. The robot according to claim 8, wherein the fixing block defines an accommodating hole to receive the elastic member, and one end of the elastic member abuts against the one of the first linkage bar and the second linkage bar and protrudes out of the accommodating hole.

10. The robot according to claim 8, further comprising a pushing ring slidably connected to the base, wherein the pushing ring comprises a projection configured to drive the one of the first linkage bar and the second linkage bar to rotate with respect to the other one of the first linkage bar and the second linkage bar, which changes the actuating member from the extension state to the flexion state so as to pull the locking member to the second position.

11. The robot according to claim 10, wherein the pushing ring comprises an inner protrusion, the base comprises an outer protrusion, and the outer protrusion rests on the inner protrusion, which prevents the pushing ring from disengaging from the base.

12. The robot according to claim 6, wherein the fixing block comprises a main body and an adjustable block fixed to the main body, and the actuating member is connected to the adjustable block.

13. The robot according to claim 12, wherein the main body defines a guiding groove, and the adjustable block comprises a slider portion slidably received in the guiding groove.

14. A connection assembly for holding a support member in position, the connection assembly comprising:
- a base defining a receiving hole to receive an end portion of the support member, and a guiding hole in a lateral surface thereof, which communicates with the receiving hole;
- a fixing block;
- a locking member slidably received in the guiding hole the locking member being slidable in a first direction relative to the base between a first position where the locking member is engaged with the support member so as to hold the support member in position, and a second position where the locking member is disengaged from the support member;
- an actuating member connected to the fixing block and the locking member the actuating member being configured to drive the locking member to move between the first position and the second position;
- an elastic member extendable in a second direction to drive the actuating member to push the locking member to the first position, the second direction being perpendicular to the first direction; and
- a pushing ring slidably connected to the base, wherein the pushing ring is slidable in a third direction relative to the base to drive the actuating member to pull the locking member to the second position, and the third direction is opposite to the second direction.

15. The connection assembly according to claim 14, wherein the actuating member comprises a first linkage bar and a second linkage bar rotatably connected to the first linkage bar, one end of the first linkage bar is rotatably connected to the fixing block, and one end of the second linkage bar is rotatably connected to the locking member, the elastic member is configured to drive the first linkage bar and the second linkage bar to rotate with respect to each other, and the pushing ring comprises a projection configured to drive the first linkage bar and the second linkage bar to rotate with respect to each other.

16. The connection assembly according to claim 15, wherein the fixing block defines an accommodating hole to receive the elastic member, and one end of the elastic member abuts against the one of the first linkage bar and the second linkage bar and protrudes out of the accommodating hole.

17. The connection assembly according to claim 14, wherein the pushing ring comprises an inner protrusion, the base comprises an outer protrusion, and the outer protrusion rests on the inner protrusion, which prevents the pushing ring from disengaging from the base.

18. The connection assembly according to claim 14, wherein the fixing block comprises a main body and an adjustable block fixed to the main body, and the actuating member is connected to the adjustable block.

19. The connection assembly according to claim 18, wherein the main body defines a guiding groove, and the adjustable block comprises a slider portion slidably received in the guiding groove.

* * * * *